Patented Nov. 9, 1948

2,453,333

UNITED STATES PATENT OFFICE 2,453,333

REACTION OF BIGUANIDE AND ETHYLENE SULFIDE

Leonard P. Moore, New York, N. Y., and Walter P. Ericks, Stamford, Conn., assignors to American Cyanamid Company, New York, N. Y., a corporation of Maine No Drawing. Application September 19, 1942, Serial No. 459,001

1 Claim. (Cl. 260—564)

This invention relates to the preparation of new biguanide derivatives. More particularly it embraces such new compounds as are prepared by the reaction of ethylene sulfide with biguanide. It relates especially to the preparation of mercapto-ethyl biguanides. This case is a continuation-in-part of Serial No. 370,146, filed December 14, 1940, by Leonard P. Moore and Walter P. Ericks, now Patent 2,323,409.

It is an object of this invention to prepare these compounds by simple and efficient processes. A further object is to obtain them in a conveniently utilizable form. Other and further objects as well as uses for the compounds herein prepared will be found in the following description.

The objects of this invention are attained by reacting ethylene sulfide with biguanide.

The new preparations find a very wide range of uses. For example, they can be applied to leather as dehairing agents. They are useful also as intermediates in the preparation of resins, some forming resinous polymerization products by simply heating the product. Still others are highly effective and cheap insecticides. Still other uses are found in the compounding of rubber and rubber containing articles where the products of this invention are found to exert favorable plasticizing and some vulcanization accelerating activity.

In order to facilitate a further understanding of the invention, the following examples are given primarily for the purpose of illustrating certain more specific details thereof. The scope of the invention is not to be deemed limited thereby except as defined in the claims.

5 g. of biguanide (0.05 mol.) and 6 g. of ethylene sulfide (0.1 mol.) were heated under a reflux condenser on a steam bath until refluxing ceased. The desired product 2-mercaptoethyl biguanide, was obtained as a white solid material weighing 9 g. When ground to a fine powder and heated to 140° C. it decomposed with an exothermic reaction.

It is to be understood that the scope of this invention is not to be limited by the examples specifically contained herein illustrating specific embodiments of the invention, since many modifications and various combining weights of the reacting ingredients may be used, but that it is to be construed broadly and restricted solely by the scope of the appended claim.

We claim:

The method of preparing ethylene sulfide-biguanide complexes which comprises refluxing biguanide and ethylene sulfide in substantially the ratio of 0.05 mol of the former to 0.1 mol of the latter.

LEONARD P. MOORE.
WALTER P. ERICKS.

REFERENCES CITED

The following references are of record in the file of this patent:

UNITED STATES PATENTS

| Number | Name | Date |
|---|---|---|
| 1,785,916 | Schotte | Dec. 23, 1930 |
| 2,121,337 | Brodersen et al. | June 21, 1938 |
| 2,136,928 | Schlack | Nov. 15, 1938 |
| 2,265,942 | Hill | Dec. 9, 1941 |

OTHER REFERENCES

Slotta et al., "Ber. deut. Chem.," vol. 62 (1929), page 1403.